(12) United States Patent
Okada

(10) Patent No.: US 10,759,002 B2
(45) Date of Patent: Sep. 1, 2020

(54) STACK FORMING APPARATUS AND MANUFACTURING METHOD OF STACK FORMATION

(71) Applicant: Kabushiki Kaisha Toshiba, Minato-ku (JP)

(72) Inventor: Naotada Okada, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 299 days.

(21) Appl. No.: 15/124,566

(22) PCT Filed: Sep. 12, 2014

(86) PCT No.: PCT/JP2014/074298
§ 371 (c)(1),
(2) Date: Sep. 8, 2016

(87) PCT Pub. No.: WO2015/141032
PCT Pub. Date: Sep. 24, 2015

(65) Prior Publication Data
US 2017/0014950 A1    Jan. 19, 2017

(30) Foreign Application Priority Data
Mar. 18, 2014   (JP) ................................. 2014-054356

(51) Int. Cl.
| | | |
|---|---|---|
| *B22F 3/105* | (2006.01) | |
| *B33Y 10/00* | (2015.01) | |
| *B23K 26/342* | (2014.01) | |
| *B22F 1/00* | (2006.01) | |
| *B33Y 70/00* | (2020.01) | |
| *B33Y 50/02* | (2015.01) | |
| *B23K 26/144* | (2014.01) | |

(Continued)

(52) U.S. Cl.
CPC .......... *B23K 26/342* (2015.10); *B22F 1/0059* (2013.01); *B22F 3/1055* (2013.01);
(Continued)

(58) Field of Classification Search
CPC ...... B22F 1/0059; B22F 1/0062; B22F 1/007; B22F 1/0074; B22F 1/0077;
(Continued)

(56) References Cited

U.S. PATENT DOCUMENTS 5,069,714 A * 12/1991 Gosselin ............... B22F 1/0059
                                                          75/252
5,286,573 A *  2/1994 Prinz ....................... B22F 3/115
                                                          264/255
(Continued)

FOREIGN PATENT DOCUMENTS

| JP | 2003-159754 A | 6/2003 |
|---|---|---|
| JP | 2005-105414 A | 4/2005 |

(Continued)

OTHER PUBLICATIONS

Daintith, John, ed., A Dictionary of Chemistry, Oxford University Press, 2008, pp. 25, 26, 292. (Year: 2008).*
(Continued)

*Primary Examiner* — Vanessa T. Luk
(74) *Attorney, Agent, or Firm* — Oblon, McClelland, Maier & Neustadt, L.L.P.

(57) ABSTRACT

A stack forming apparatus includes a nozzle device that includes a nozzle configured to supply powder to a target and to irradiate the target with an energy beam, and a supply device which selectively supplies the nozzle with a powdery forming material to form layers that form a formation, and a powdery support material to form a support layer which permits the layers formed by the forming material to be formed on the top surface thereof. The stack forming apparatus further includes an optical system which outputs the energy beam to the nozzle, and a controller which drives the nozzle and which is configured to control the supply amount of the forming material to be supplied to the nozzle and the supply amount of the support material and which stacks the layers formed by the forming material and the support layer on the target.

5 Claims, 9 Drawing Sheets

(51) Int. Cl.
*B23K 26/70* (2014.01)
*B33Y 30/00* (2015.01)
(52) U.S. Cl.
CPC .......... *B23K 26/144* (2015.10); *B23K 26/702* (2015.10); *B33Y 50/02* (2014.12); *B33Y 70/00* (2014.12); *B22F 2003/1056* (2013.01); *B22F 2003/1057* (2013.01); *B33Y 10/00* (2014.12); *B33Y 30/00* (2014.12); *Y02P 10/295* (2015.11)
(58) Field of Classification Search
CPC ............ B22F 2001/0066; B22F 3/1055; B22F 2003/1056; B22F 2003/1057; B22F 2003/1058; B22F 2003/1059; B22F 3/105; B29C 64/141; B29C 64/153; B29C 64/165; B29C 64/171; B29C 64/182; B29C 64/188; B29C 64/194; B29C 64/336
See application file for complete search history.

(56) References Cited

U.S. PATENT DOCUMENTS

| | | | | |
|---|---|---|---|---|
| 5,555,481 A | * | 9/1996 | Rock | ........................ B22F 3/008 29/239 |
| 5,745,834 A | * | 4/1998 | Bampton | ................... B22F 3/10 419/37 |
| 7,815,847 B2 | * | 10/2010 | Gennaro | ............... B22F 3/1055 419/25 |
| 2006/0165546 A1 | | 7/2006 | Yamada et al. | |

FOREIGN PATENT DOCUMENTS

| | | |
|---|---|---|
| JP | 2006-200030 A | 8/2006 |
| JP | 2011-5658 A | 1/2011 |
| JP | 2012-96428 A | 5/2012 |
| JP | 2015-38166 A | 2/2015 |
| WO | WO-2008154926 A1 * 12/2008 | .............. B01J 37/06 |
| WO | WO 2016/047549 A1 | 3/2016 |

OTHER PUBLICATIONS

Wypych, George, Handbook of Polymers, ChemTec Publishing, 2012, p. 628-630. (Year: 2012).*

International Search Report dated Dec. 9, 2014 in PCT/JP14/074298 Filed Sep. 12, 2014.

Japanese Office Action dated Sep. 11, 2015 in Japanese Application 2015-513924 (with English Translation).

* cited by examiner

STACK FORMING APPARATUS AND MANUFACTURING METHOD OF STACK FORMATION

CROSS-REFERENCE TO RELATED APPLICATIONS

This application is a national stage application of International Application No. PCT/JP2014/074298, filed Sep. 12, 2014, which designates the United States and is hereby incorporated by reference, and which claims priority to Japanese Patent Application No. 2014-054356, filed Mar. 18, 2014, the entire contents of which is hereby incorporated by reference.

FIELD

Embodiments described herein relate generally to a stack forming apparatus and a manufacturing method of a stack formation.

BACKGROUND

Heretofore, as a method of manufacturing a stack formation, there has been known a technique called directed energy deposition which injects a powdery forming material comprising a metallic material, forms a layer by irradiating the forming material with laser light to melt the forming material, and repeats such a process, thereby stacking layers to manufacture a stack formation having a three-dimensional shape.

A problem to be solved by the present invention lies in providing a stack forming apparatus and a manufacturing method of a stack formation which can form a partly protruding stack formation.

BRIEF DESCRIPTION OF DRAW

DETAILED DESCRIPTION

A stack forming apparatus according to an embodiment comprises a nozzle device, an optical system, and a controller. The nozzle device comprises a nozzle which is configured to supply powder to a target and which is configured to irradiate the target with an energy beam, and a supply device which selectively supplies the nozzle with a powdery forming material to form layers that form a formation, and a powdery support material to form a support layer which permits the layers formed by the forming material to be formed on the top surface thereof. The optical system outputs, to the nozzle, the energy beam which is configured to melt the forming material supplied to the target and which partly melts the support material supplied to the target. The controller drives the nozzle, is configured to control the supply amount of the forming material to be supplied to the nozzle and the supply amount of the support material, and stacks the layers formed by the forming material and the support layer on the target.

First Embodiment

Hereinafter, a stack forming apparatus 1 and a manufacturing method of a stack formation 100 according to the first embodiment will be described with reference to FIG. 1 to FIG. 7.

Figure 1:
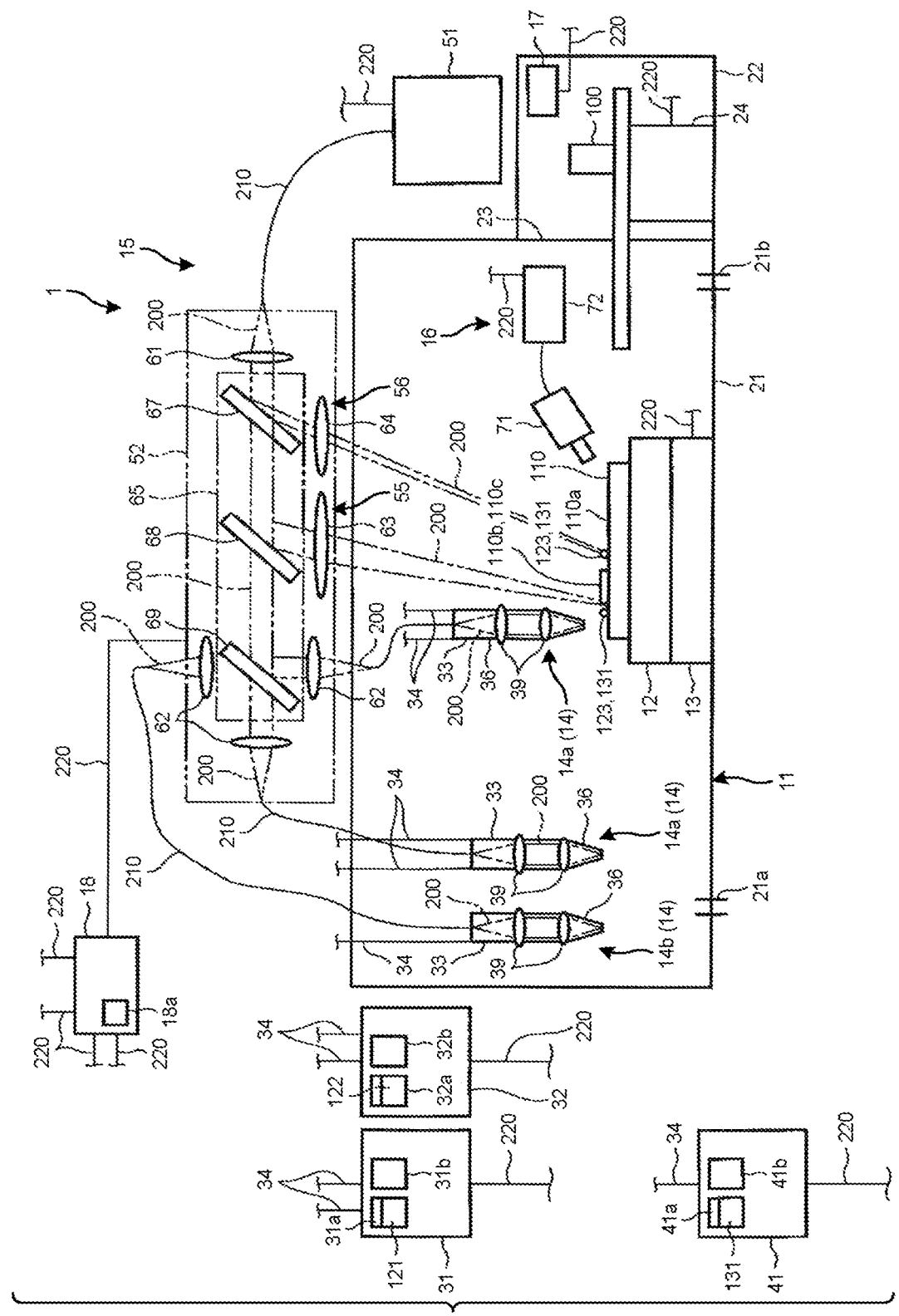
FIG. 1 is an explanatory diagram schematically showing the configuration of a stack forming apparatus according to the first embodiment.
Figure 2:
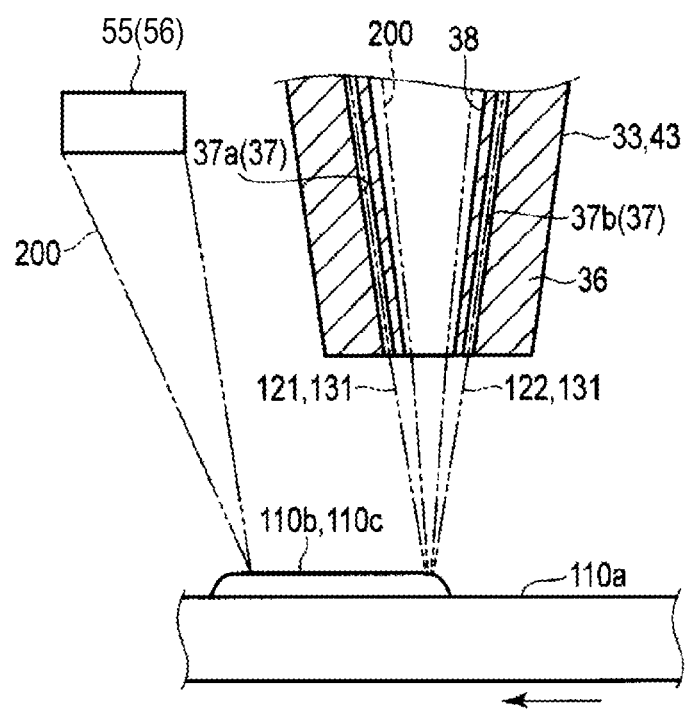
FIG. 2 is an explanatory diagram schematically showing the configurations of essential parts of the same stack forming apparatus.
Figure 3:
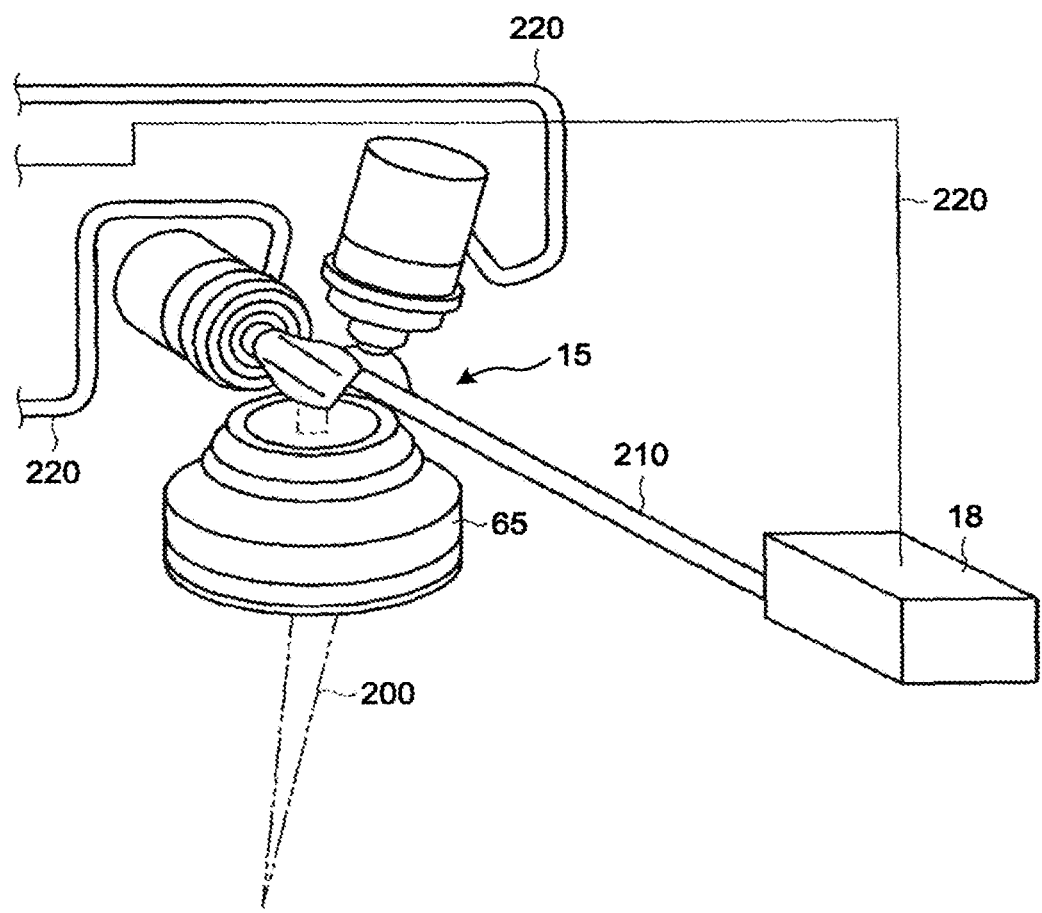
FIG. 3 is a perspective view showing the configurations of essential parts of the same stack forming apparatus.
Figure 4:
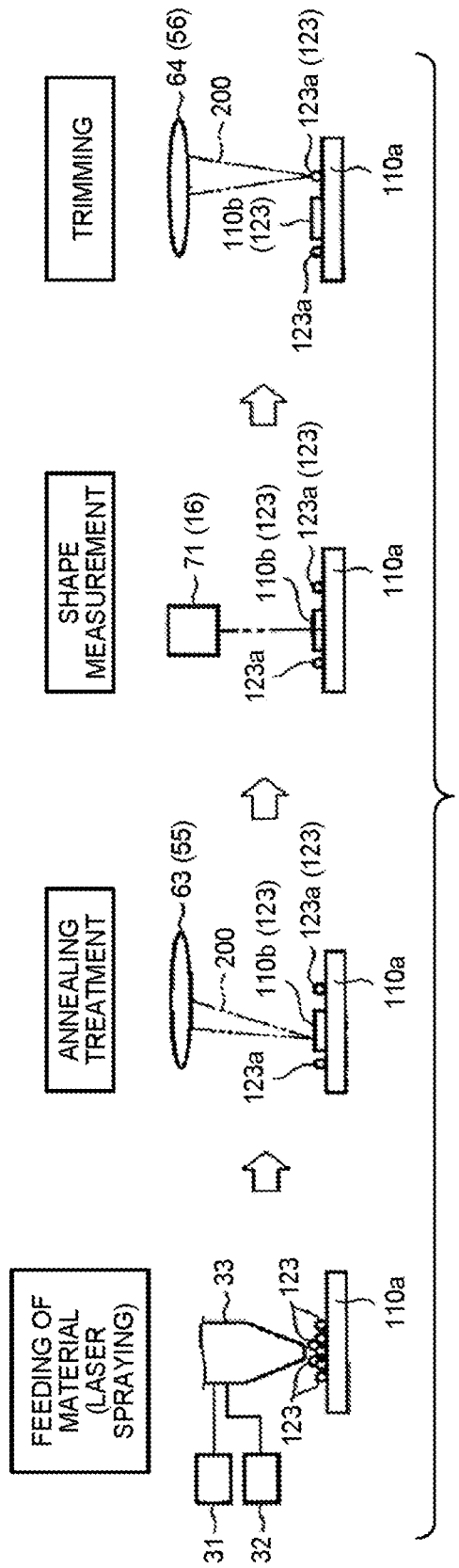
FIG. 4 is an explanatory diagram showing an example of the manufacture of a stack formation using the same stack forming apparatus.
Figure 5:
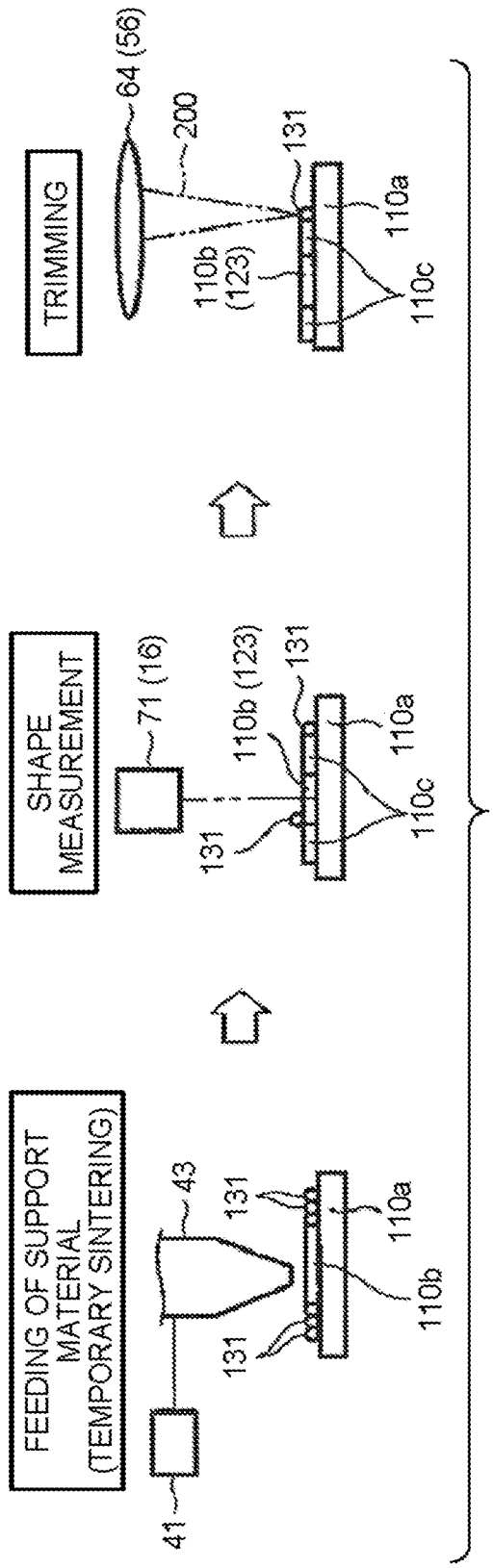
FIG. 5 is an explanatory diagram showing an example of the manufacture of a support formation that uses the same stack forming apparatus.
Figure 6:
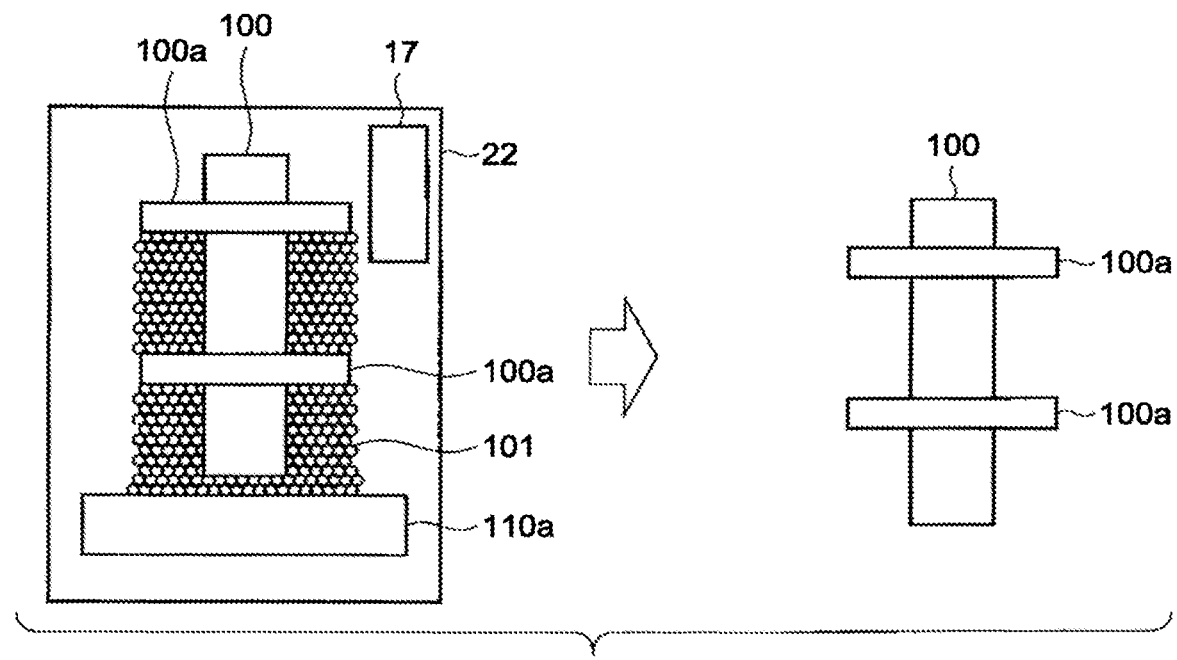
FIG. 6 is an explanatory diagram showing an example of the manufacture of the same stack formation.
Figure 7:
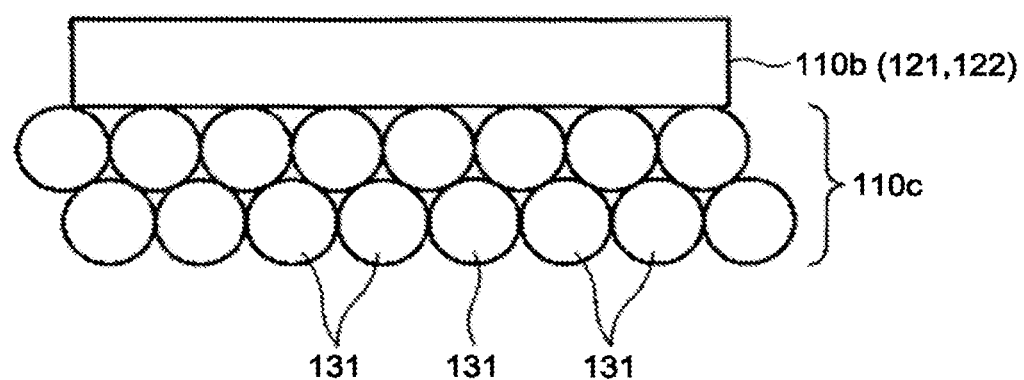
FIG. 7 is an explanatory diagram showing an example of the configurations of the same stack formation and the support formation.

FIG. 1 is an explanatory diagram schematically showing the configuration of the stack forming apparatus 1 according to the first embodiment. FIG. 2 is a sectional view showing the configurations of nozzles 33 and 43 used in the stack forming apparatus 1. FIG. 3 is a perspective view showing the configuration of a galvano-scanner 65 of an optical device 15 used in the stack forming apparatus 1. FIG. 4 is an explanatory diagram showing an example of the manufacture of the stack formation 100 using the stack forming apparatus 1. FIG. 5 is an explanatory diagram showing an example of the manufacture of a support formation 101 using the stack forming apparatus 1. FIG. 6 is an explanatory diagram showing an example of the manufacture of the stack formation 100. FIG. 7 is an explanatory diagram showing the configurations of a layer 110b and a support layer 110c as examples of the configurations of the stack formation 100 and the support formation 101.

As shown in FIG. 1, the stack forming apparatus 1 comprises a treatment tank 11, a stage 12, a moving device 13, a nozzle device 14, the optical device 15, a measurement device 16, a removing device 17, and a controller 18. The stack forming apparatus 1 is configured to be able to form the stack formation 100 having a predetermined shape by stacking layers of forming materials 121 and 122 supplied by the nozzle device 14 on a target 110 provided on the stage 12. In addition, the stack formation 100 is formed into a so-called overhang shape which partly protrudes and has protrusions 100a, as shown in FIG. 6.

Moreover, the stack forming apparatus 1 is configured to stack layers of a support material 131 supplied by the nozzle device 14 on the target 110 so that the support formation 101 for supporting the protrusions 110a can be formed in a range in which at least the protrusions 100a are provided under the protrusions 100a of the stack formation 100.

The target 110 is, for example, a base 110a having an upper surface on which the stack formation 100 is to be formed, the layer 110b which constitutes part of the stack formation 100, or the support layer 110c which constitutes part of the support formation 101. The target 110 is a target to which the forming materials 121 and 122 and the support material 131 are supplied by the nozzle device 14.

The forming materials 121 and 122 are powdery metallic materials, and a single metallic material or multiple different metallic materials such as the first forming material 121 and the second forming material 122 are used. Described in the present embodiment is a configuration in which the stack formation 100 is formed by use of the two forming materials: the first forming material 121 and the second forming material 122. The support material 131 is, for example, a powdery metallic material.

The treatment tank 11 comprises a main chamber 21, an auxiliary chamber 22 formed adjacent to the main chamber 21, and a door 23 which can open and shut the main chamber 21 and airtightly close the main chamber 21. The main chamber 21 is formed so that the stage 12, the moving device 13, part of the nozzle device 14, and the measurement device 16 can be disposed therein.

The main chamber 21 comprises a supply hole 21a to supply inert gases such as nitrogen and argon, and a discharge hole 21b to discharge the gasses in the main chamber 21. The supply hole 21a of the main chamber 21 is connected to a supply device which supplies the inert gases. The discharge hole 21b is connected to a discharge device which discharges the gasses in the main chamber 21.

The auxiliary chamber 22 is formed so that the main chamber 21 and the space can be continuous via the door 23. For example, the stack formation 100 treated in the main chamber 21 is conveyed to the auxiliary chamber 22.

The auxiliary chamber 22 comprises a transfer device which carries, for example, the manufactured stack formation 100 and conveys the stack formation 100 from the main chamber 21, and a conveying device 24 such as a conveying arm which sucks the stack formation 100 with, for example, a vacuum head and then conveys the stack formation 100. The auxiliary chamber 22 also comprises therein the removing device 17 which removes the support formation 101 from the stack formation 100. The auxiliary chamber 22 is isolated from the main chamber 21 by the closing of the door 23 when the stack formation 100 is formed.

The stage 12 is formed so that the target 110 can be supported thereon. The moving device 13 is configured to be able to move the stage 12 in three axial directions.

The nozzle device 14 is configured to be able to selectively supply predetermined amounts of multiple kinds of forming materials 121 and 122 to the target 110 on the stage 12, and to be able to emit laser light 200 as an energy beam to melt the forming materials 121 and 122. More specifically, the nozzle device 14 comprises a first nozzle device 14a which supplies the forming materials 121 and 122 to form the stack formation 100, and a second nozzle device 14b which supplies the support material 131 to support the stack formation 100. In the first nozzle device 14a and the second nozzle device 14b, similar components are provided with the same signs, and detailed descriptions thereof are omitted.

The first nozzle device 14a comprises a first supply device 31 which can supply the first forming material 121, a second supply device 32 which can supply the second forming material 122, the nozzle 33 connected to the first supply device 31, the second supply device 32, and the optical device 15, and supply pipes 34 which connect the first supply device 31 and the nozzle 33 as well as the second supply device 32 and the nozzle 33.

The first forming material 121 is a powdery metallic material. The second forming material 122 is a powdery metallic material different from the first forming material.

The first supply device 31 comprises a tank 31a to store the first forming material 121, and supply means 31b for supplying a predetermined amount of the first forming material 121 to the nozzle 33 from the tank 31a. The supply means 31b is configured to be able to supply the first forming material 121 in the tank 31a to the nozzle 33 by using the inert gases of nitrogen and argon as carriers. The supply means 31b is also configured to be able to adjust the supply amount the first forming material 121 to be supplied, and the injection speed (supply speed) of the first forming material 121 to be injected from the nozzle 33.

The second supply device 32 comprises a tank 32a to store the second forming material 122, and supply means 32b for supplying a predetermined amount of the second forming material 122 to the nozzle 33 from the tank 32a. The supply means 32b is configured to be able to supply the second forming material 122 in the tank 32a to the nozzle 33 by using the inert gases of nitrogen and argon as carriers. The supply means 32b is also configured to be able to adjust the supply amount of the second forming material 122 to be supplied, and the injection speed (supply speed) of the second forming material 122 to be injected from the nozzle 33.

The nozzle 33 is connected to the first supply device 31 and the second supply device 32 via the supply pipes 34. The nozzle 33 is connected to the optical device 15 via a cable 210 which can transmit the laser light 200. The nozzle 33 is configured to be able to move relative to the stage 12.

The nozzle 33 comprises a cylindrical outer envelope 36, an injection hole 37 which is provided in the outer envelope 36 and which injects the first forming material 121 and the second forming material 122 from its distal end, a light passage 38 which passes the laser light 200, and optical lenses 39 provided in the light passage 38. The nozzle 33 is configured to be able to mix the first forming material 121 and the second forming material 122 in powder form supplied from the first supply device 31 and the second supply device 32.

For example, the nozzle 33 is configured to be able to mix therein the first forming material 121 and the second forming material 122 in powder form supplied from the first supply device 31 and the second supply device 32, or to be able to respectively inject the first forming material 121 and the second forming material 122 from the injection holes 37 and mix the first forming material 121 and the second forming material 122 after the injection.

In the configuration described according to the present embodiment, more than one injection hole 37 is provided, and one of the injection holes 37 is a first injection hole 37a connected to the first supply device 31, and the other is a second injection hole 37b connected to the second supply device 32.

As shown in FIG. 2, for example, the injection holes 37 are formed aslant relative to the axial center of the outer envelope 36 and the optical center of the laser light 200 to be emitted so that the first forming material 121 and the second forming material 122 conveyed by the gasses supplied from the first supply device 31 and the second supply device 32 intersect with each other at a predetermined distance from the injection holes 37.

The light passage 38 is provided along the axial center of the outer envelope 36. The optical lenses 39 are provided in, for example, the light passage 38. Two optical lenses 39 are provided so that the laser light 200 from the cable 210 can be converted into parallel light and the parallel light can be converged. The optical lenses 39 are configured to most converge at a predetermined position, more specifically, at the intersection of the first forming material 121 and the second forming material 122 that are injected from the injection holes 37.

The second nozzle device 14*b* comprises a third supply device 41 which can supply the support material 131, the nozzle 43 connected to the third supply device 41 and the optical device 15, and the supply pipes 34 which connect the third supply device 41 and the nozzle 43.

The third supply device 41 comprises a tank 41*a* to store the support material 131, and supply means 41*b* for supplying a predetermined amount of the support material 131 to the nozzle 43 from the tank 41*a*. The supply means 41*b* is configured to be to supply the support material 131 in the tank 41*a* to the 43 by using the inert gases of nitrogen and argon as carriers. The supply means 41*b* is also configured to be able to adjust the supply amount of the support material 131 to be supplied, and the injection speed (supply speed) of the support material 131 to be injected from the nozzle 43.

The support material 131 is a powdery metallic material, and is made of a material having a melting point higher than those of the first forming material 121 and the second forming material 122 to form the stack formation 100.

The nozzle 43 is connected to the third supply device 41 via the supply pipes 34. The nozzle 43 is connected to the optical device 15 via a cable 210 which can pass the laser light 200. The nozzle 43 is configured to be able to move relative to the stage 12.

The nozzle 43 comprises a cylindrical outer envelope 36, injection holes 37 which are provided in the outer envelope 36 and which inject the support material 131 from its distal end, a light passage 38 which passes the laser light 200, and optical lenses 39 provided in the light passage 38.

As shown in FIG. 1 and FIG. 3, the optical device 15 comprises a light source 51, and an optical system 52 connected to the light source 51 via the cable 210. The light source 51 has a transmission element, and is a supply source of the laser light 200 which is configured to be able to emit the laser light 200 from the transmission element. The light source 51 is configured to be able to change powder density of the laser light to be emitted.

The optical system 52 configured to be able to supply the laser light 200 emitted from the light source 51 to the nozzles 33 and 43 and to irradiate the base 110*a*, the layer 110*b*, and the support layer 110*c* which are the targets 110 with the laser light 200.

More specifically, the optical system 52 comprises a first lens 61, a second lens 62, a third lens 63, a fourth lens 64, and the galvano-scanner 65. The first lens 61, the second lens 62, the third lens 63, and the fourth lens 64 are fixed to the optical system 52. The optical system 52 may be configured to comprise an adjustment device which can move the first lens 61, the second lens 62, the third lens 63, and the fourth lens 64 in two axial directions, more specifically, in directions that intersect at right angles with or intersect with an optical path.

The first lens 61 is configured to be able to convert the laser light 200 which has been brought in via the cable 210 into parallel light and to bring the converted laser light 200 to the galvano-scanner 65. The same number of second lenses 62 as the nozzles 33 and 43 are provided. In the present embodiment, three second lenses 62 are provided. The second lens 62 is configured to be able verge the laser light 200 emitted from the galvano-scanner 65 and to emit the laser light 200 to the nozzle 33 via the cable 210.

The third lens 63 is configured to be able to converge the laser light 200 emitted from the galvano-scanner 65 and to emit the laser light 200 onto the target 110. The fourth lens 64 is configured to be able to converge the laser light 200 emitted from the galvano-scanner 65 and to emit the laser light 200 onto the target 110.

The galvano-scanner 65 is configured to be able to split the parallel light converted by the first lens 61 into the second lens 62, the third lens 63, and the fourth lens 64. The galvano-scanner 65 comprises a first galvano-mirror 67, a second galvano-mirror 68, and a branch mirror 69. Each of the galvano-mirrors 67 and 68 is configured to be able to vary the inclination angle and split the laser light 200. The branch mirror 69 is configured to be able to split the laser light 200.

The first galvano-mirror 67 transmits some of the laser light 200 which has passed through the first lens 61 and thereby emits the laser light 200 to the second galvano-mirror 68, and reflects the remainder of the laser light 200 and thereby emits the laser light 200 to the fourth lens 64. The first galvano-mirror 67 is configured to be able to adjust, by its inclination angle, the application position of the laser light 200 which has passed through the fourth lens 64.

The second galvano-mirror 68 emits some of the laser light 200 to the branch mirror 69, and reflects and then emits the remainder of the laser light 200 to the third lens 63. The second galvano-mirror 68 is configured to be able to adjust, by its inclination angle, the application position of the laser light 200 which has passed through the third lens 63.

The branch mirror 69 emits the laser light light 200 to the second lens 62. The branch mirror 69 is configured to reflect and then emit the laser light 200 to the second lens 62, or configured to selectively emit the laser light 200 to one of the second lenses 62.

This optical system 52 constitutes a melting device 55 which heats the first forming material 121 (123) and the second forming material 122 (123) supplied to the target 110 by the first galvano-mirror 67, the second galvano-mirror 68, and the third lens 63, or the support material 131 to form and anneal the layer 110*b* and the support layer 110*c*.

The melting device 55 uses the laser light 200 to melt the first forming material 121 and the second forming material 122 supplied onto the base 110*a* or onto the formed layer 110*b* from the nozzle 33, and forms the layer 110*b*. The melting device 55 also uses the laser light 200 to melt some of the support material 131 supplied onto the base 110*a*, onto the layer 110*b*, or onto the support layer 110*c* from the nozzle 43, and forms the support layer 110*c*.

The optical system 52 also constitutes a trimming device 56 which uses the laser light 200 supplied by the first galvano-mirror 67 and the fourth lens 64 to remove unnecessary parts formed on the base 110*a*, the layer 110*b* and the support layer 110*c* by the first forming material 121, the second forming material 122, and the support material 131.

The trimming device 56 is configured to be able to remove, for example, materials scattered onto the base 110*a* during the supply of the first forming material 121, the second forming material 122, and the support material 131 from the nozzles 33 and 43 or unnecessary parts generated during the formation of the layer 110b and the support layer 110c. The unnecessary parts are different from the predetermined shape of the stack formation 100 and the predetermined shape of the support formation 101. The trimming device 56 is configured to be able to emit the laser light 200 having powder density that can remove the above-mentioned parts.

The measurement device 16 is configured to be able to measure the shapes of the layer 110b and the support layer 110c and the shapes of the formed stack formation 100 and the support formation 101 which are the shapes of the solidified materials 121, 122, and 131 on the base 110a. The measurement device 16 is configured to be able to send information regarding the measured shapes to the controller 18.

For example, the measurement device 16 comprises a camera 71, and an image processor 72 which performs image processing on the basis of information measured by the camera 71. The measurement device 16 is configured to be able to measure, by, for example, an interference method or a light-section method, the shapes of the layer 110b, the support layer 110c, the stack formation 100, and the support formation 101.

The removing device 17 is configured to be able to mechanically remove the support formation 101 by, for example, a shot blast. The removing device 17 may be configured to remove the support formation 101 by, for example, cutting.

The controller 18 is electrically connected to the moving device 13, the removing device 17, the conveying device 24, the first supply device 31, the second supply device 32, the third supply device 41, the light source 51, the galvano-scanner 65, and the image processor 72 via signal lines 220.

The controller 18 is configured to be able to move the stage 12 in three axial directions by controlling the moving device 13. The controller 18 is configured to be able to convey the formed stack formation 100 to the auxiliary chamber 22 by controlling the conveying device 24, and to be able to remove the support formation 101 from the stack formation 100 conveyed to the auxiliary chamber 22 by controlling the removing device 17. The controller 18 is configured to be able to adjust the supply of the first forming material 121 and the supply amount and supply speed of the first forming material 121 by controlling the supply means 31b.

The controller 18 is configured to be able to adjust the supply of the second forming material 122 and the supply amount and supply speed of the second forming material 122 by controlling the supply means 32b. The controller 18 is configured to be able to adjust the supply of the support material 131 and the supply amount and supply speed of the support material by controlling the supply means 41b.

The controller 18 is configured to be able to adjust the power density laser light 200 emitted from the light source 51 by controlling the light source 51. The controller 18 is configured to be able to adjust the inclination angles of the first galvano-mirror 67, the second galvano-mirror 68, and the branch mirror 69 by controlling the galvano-scanner 65. The controller 18 is also configured to be able to move the nozzle 33.

The controller 18 comprises a storage 18a. The shape of the stack formation 100 to be formed and the shape of the support formation 101 are stored in the storage 18a as thresholds. The ratio between the forming materials 121 and 122 in each layer 110b of the stack formation 100 to be formed is a stored in the storage 18a. Here, when the shape of the stack formation 100 to be formed has the protrusion 100a of the so-called overhang structure protruding in a surface direction as shown in FIG. 6, the support formation 101 is set the same shape as the shape of the protrusion 100a in the protruding direction, i.e., the shape of the layer 110b in the surface direction that forms the stack formation 100, or set to a shape larger than the shape of the protrusion 100a in the surface direction, in the lower layer of the protrusion 100a. In addition, the support formation 101 may have a shape smaller than the shape of the protrusion 100a in the surface direction as long as the protrusion 100a can be formed.

The controller 18 has the following functions (1) to (4).

(1) A function of selectively injecting the first forming material 121 and the second forming material 122 from the nozzle 33.

(2) A function of injecting the support material 131 from the nozzle 43.

(3) A function of judging the shapes of the layer 110b and the support layer 110c formed on the base 110a.

(4) A function trimming the materials 121, 122, and 131 on the base 110a and the stack formation 100.

Now, these functions (1) to (4) are described.

The function (1) is a function of selectively injecting the first forming material 121 and the second forming material 122 from the nozzle 33 on the basis of the preset ratio between the first forming material 121 and the second forming material 122 in each layer 110b of the stack formation 100 stored in the storage 18a, and forming the layer 110b.

More specifically, the nozzle 33 is moved relative to the target 110, and the supply means 31b and 32b of the first supply device 31 and the second supply device 32 are controlled when the predetermined layer 110b of the stack formation 100 is formed. Thus, the ratio between the first forming material 121 and the second forming material 122 set in the layer 110b is adjusted to inject the first forming material 121 and the second forming material 122 to the target 110 from the nozzle 33 in the predetermined supply amount and at the predetermined supply speed.

Furthermore, the laser light 200 is emitted from the nozzle 33, and the laser light 200 is then applied to the target 110 and the first forming material 121 and the second forming material 122 that have been injected, and the first forming material 121 and the second forming material 122 are melted. For example, the laser light 200 is further applied to an aggregate of the layer 110b on the target 110, and the layer 110b is remelted and thus annealed.

When, for example, the stack formation 100 is partly formed by different forming materials or ratios, the ratio between the first forming material 121 and the second forming material 122 is changed to form a slanted material.

In more detail, for example, when one end side of the stack formation 100 is only formed by the first forming material 121 and the other end side is only formed by the second forming material 122, the first forming material alone is first supplied to stack the layer 110b on the base 110a by the application of the laser light 200 and form a part which is formed by the first forming material 121 alone. The ratio between the first forming material 121 and the second forming material 122 is then changed by degrees up to the part formed by the second forming material 122 alone, and the ratio of the forming materials of the layer 110b is changed and then the first forming material 121 and the second forming material 122 are supplied so that the ratio between the first forming material and the second forming material is fifty percent at an intermediate position between the part formed by the first forming material 121 alone and the part formed by the second forming material 122 alone. The laser light 200 having power density at which the first forming material 121 and the second forming material 122 are melted is applied to the first forming material 121 and the second forming material 122 that have been supplied, and the first forming material 121 and the second forming material 122 are thereby melted, and each layer 110*b* is formed.

Thus, the function (1) is a function of forming the preset layers 110*b* of the stack formation 100 on the target 110 so that the ratio between the first forming material 121 and the second forming material 122 is variable.

The function (2) is a function of selectively injecting the support material 131 from the nozzle 43 on the basis of each support layer 110*c* of the support formation 101 that has been preset and that has been stored in the storage 18*a*, and forming the support layer 110*c*.

More specifically, when the predetermined support layer 110*c* of the support formation 101 is formed, the nozzle 43 is moved relative to the target 110 to a range in which the support layer 110*c* of the support formation 101 formed in the same layer as the layer 110*b* of the stack formation 100 formed by the function (1) is formed, and the supply means 41*b* of the third supply device 41 is controlled. Thus, the support material 131 is injected to the target 110 from the nozzle 43 in the predetermined supply amount and at the predetermined supply speed.

Furthermore, the laser light 200 having power density to melt part of the support material 131 is emitted from the nozzle 43, and then applied to the support material 131 injected from the nozzle 43. Thus, the support material 131 is partly melted without being completely melted, and the support layer 110*c* in which the support materials 131 are partly bonded to each other is thereby formed. In addition, the support layer 110*c* may be formed before the layer 110*b* in the same stratum of the stack formation 100 is formed by the function (1).

Thus, the function (2) is a function of forming each support layer 110*c* of the support formation 101 that has been preset on the target 110.

The function (3) is a function of using the measurement device 16 to measure the shape of the layer 110*b*, the stack formation 100, the support layer 110*c*, or the support formation 101 formed by the first forming material 121, the second forming material 122, and the support material 131 injected from the nozzles 33 and 43 on the base 110*a*, and comparing the shape with the threshold in the storage 18*a* to judge whether the layer 110*b* and the support layer 110*c* have the predetermined shapes.

In more detail, the materials 121, 122, and 131 are injected toward the base 110*a* from the nozzles 33 and 43 by the use of the gasses, and the materials 121, 122, and 131 are melted by the laser light 200. Thus, when the materials 121, 122, and 131 are supplied onto the base 110*a*, parts of the materials 121, 122, and 131 may be scattered and a part which is different from the predetermined shape may be formed. Moreover, since the first forming material 121 and the second forming material 122 are configured to be melted, the first forming material 121 and the second forming material 122 that have melted may flow, and the first forming material 121 and the second forming material 122 may flow to positions different from the predetermined shapes.

Thus, the function (3) is a function of comparing the shape measured by the measurement device 16 with the threshold stored in the storage 18*a*, and judging whether the layer 110*b* and the support layer 110*c* that have been formed have the predetermined shapes. In other words, the function (3) is a function of judging whether the materials 121, 122, and 131 are attached to the part which is different from the predetermined shape of the stack formation 100 and the stack formation 100 has a part projecting from the predetermined shape (threshold). It is preferable that the judgment by the function (3) is performed whenever the layer 110*b* and the support layer 110*c* are formed by the function (1) and the function (2), respectively.

The function (4) is a function of removing the materials 121, 122, and 131 that are in parts different from the predetermined shape and that have been measured by the function (3) and thereby trimming the materials 121, 122, and 131 supplied from the nozzles 33 and 43 into the predetermined shapes. More specifically, when it is judged that the materials 121, 122, and 131 are supplied to parts different from the predetermined shape by the function (3), the light source 51 is controlled so that the laser light 200 emitted from the fourth lens 64 via the first galvano-mirror 67 has a power density that can evaporate the materials 121, 122, and 131. The first galvano-mirror 67 is then controlled, and the laser light 200 is applied to this part to evaporate the materials 121, 122, and 131. Thus, the function (4) is a function of trimming the formed layer 110*b* and support layer 110*c* into the predetermined shapes.

Now, the manufacturing method of the stack formation 100 using the stack forming apparatus 1 is described with reference to FIG. 2, and FIG. 4 to FIG. 7.

First, as shown in FIG. 2 and FIG. 4, the controller 18 controls the first supply device 31 and the second supply device 32 to inject and then melt (spray) predetermined amounts of the first forming material 121 and the second forming material 122 from the nozzle 33 within a predetermined range of the target 110. More specifically, the first supply device 31 and the second supply device 32 are controlled by the controller 18, and the first forming material 121 and/or the second forming material 121 are injected from the injection holes 37 at a predetermined ratio to produce a predetermined forming material for the layer 110*b* to be formed. The laser light 200 is applied to melt the injected forming materials 121 and 122.

As a result, a molten pool is formed in a range in which the layer 110*b* is formed on the base 110*a*, and the first forming material 121 and the second forming material 122 that have been supplied at the predetermined ratio are melted in the molten pool. The melted forming material 123 produced accordingly is solidified by, for example, natural cooling, and the layer 110*b* is thereby formed. In addition, the molten pool is a melted part formed by the first forming material 121, the second forming material 122, and the target 110 that have been melted by the application of the laser light 200.

The melting device 55 then controlled to apply the laser light 200 to the aggregate of the layer 110*b*, and the layer 110*b* made of the forming material 123 is remelted and then annealed. The measurement device 16 then measures the annealed layer 110*b* (forming material 123) on the base 110*a*. The controller 18 compares the shape of the layer 110*b* on the base 110*a* measured by the measurement device 16 with the threshold stored in the storage 18*a*.

When the layer 110*b* formed on the base 110*a* is different from the predetermined shape, or when a forming material 123*a* is attached to a position different from the predetermined shape as indicated by 123*a* in FIG. 4, that is, when the measured shape has deviated from the threshold, the controller 18 judges that the shape is abnormal. The controller 18 controls the trimming device 56 to apply the laser light 200 to the part different from the predetermined shape or the attached forming material 123a, and evaporate the unnecessary forming material 123. Thus, the controller 18 applies the laser light 200 to the part where the shape of the layer 110b measured by the measurement device 16 is different from the predetermined shape to remove the unnecessary forming material 123, thereby trimming the layer 110b into a predetermined shape.

When the forming material 123 on the base 110a is formed into the layer 110b having the predetermined shape or when the trimming of the layer 110b finished, the controller 18 then forms the support layer 110c. More specifically, as shown in FIG. 2 and FIG. 5, the controller 18 controls the light source 41 to inject a predetermined amount of the support material 131 to a predetermined range of the target 110 from the nozzle 43, and melt part of the support materials 131 by the application of the laser light 200 so that some of the support materials 131 are bonded to each other. As a result, the support layer 110c in which the support materials 131 are melted together and partly bonded to each other is formed.

The measurement device 16 then measures the formed support layer 110c (support materials 131). The controller 18 compares the shape of the support layer 110c on the base 110a measured by the measurement device 16 with the threshold stored in the storage 18a.

When the support layer 110c formed on the base 110a is different from the predetermined shape or when the support material 131 is attached to a position different from the predetermined shape, the controller 18 controls the trimming device 56 to apply the laser light 200 to the part different from the predetermined shape or the attached support material 131, and evaporate the unnecessary support material 131. Thus, the controller 18 applies the laser light 200 to the part where the shape of the support layer 110c measured by the measurement device 16 is different from the predetermined shape to remove the unnecessary support material 131, thereby trimming the support layer 110c into a predetermined shape.

After the end of the trimming of the support layer 110c, the controller 18 again controls the first supply device 31 and the second supply device 32 to newly form a layer 110b on the formed layer 110b or support layer 110c, and then forms the support layer 110c in the same stratum if necessary. The controller 18 repeatedly forms layers 110b and support layers 110c, and stacks layers 110b and the support layers 110c. By repeatedly forming the layers 110b and the support layers 110c, the controller 18 forms the stack formation 100 in which the protrusion 100a is supported by the support formation 101, as shown in FIG. 6.

The controller 18 then conveys the stack formation 100 to the auxiliary chamber 22 by the conveying device 24, as shown in FIG. 6. The controller 18 then drives the removing device 17, and shot-blasts the stack formation 100. Since the support formation 101 is configured so that part of the support material 131 is bonded, bonding portions bonded to each other are broken by the shot blast, and the support formation 101 is removed from the stack formation 100. The stack formation 100 is formed by these processes.

The stack forming apparatus 1 having the above-mentioned configuration can support the stack formation 100 by the support formation 101 even if the stack formation 100 to be formed has the protrusion 100a. In other words, according to the stack forming apparatus 1, the layer 110b can be formed on the formed support layer 110c. Thus, even in the configuration in which the stack formation 100 is formed by the so-called directed energy deposition that ejects the forming materials 121 and 122 from the nozzle 33 and then melts the forming materials 121 and 122 by the laser light 200 to form the layer 110b, it is possible to form the stack formation 100 of the so-called overhang shape having the protrusion 100a partly protruding in the surface direction of the layer 110b.

Since the support formation 101 is configured so that so-called temporary sintering is performed to only partly melt and bond the support material 131 without completely melting the support material 131, the support formation 101 can be mechanically removed by the shot blast.

Thus, the support formation 101 can be easily removed. The support material 131 is a material having a melting point higher than those of the first forming material 121 and the second forming material 122 to form the stack formation 100, so that it is possible to prevent the support material 131 from melting in the first forming material 121 and the second forming material 122 when the layer 110b is formed on the support layer 110c by the first forming material 121 and the second forming material 122.

As described above, according to the manufacturing method of the stack formation 100 using the stack forming apparatus 1 in the present embodiment, it is possible to form the stack formation 100 which has a partly protruding overhang shape and which is a shape with the protrusion 100a. It is also possible to easily remove the support formation 101 for forming the protrusion 100a.

Second Embodiment

Figure 9:
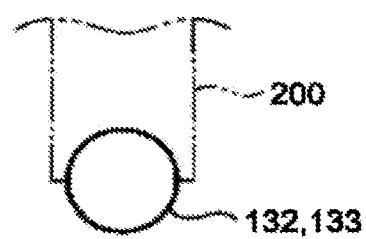
FIG. 9 is an explanatory diagram showing an example of the manufacture of the support formation using the same stack forming apparatus.
Figure 10:
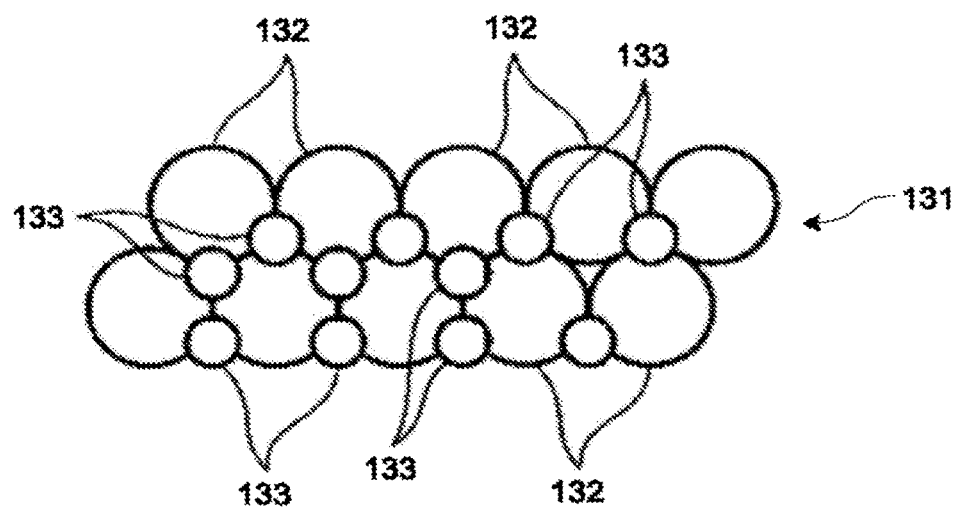
FIG. 10 is an explanatory diagram showing the configurations of a main material and a bind material of a support material used in the same stack forming apparatus.

Now, a manufacturing method of a stack forming apparatus 1A and the stack formation 100 according to the second embodiment is described with reference to FIG. 8 to FIG. 10.

Figure 8:
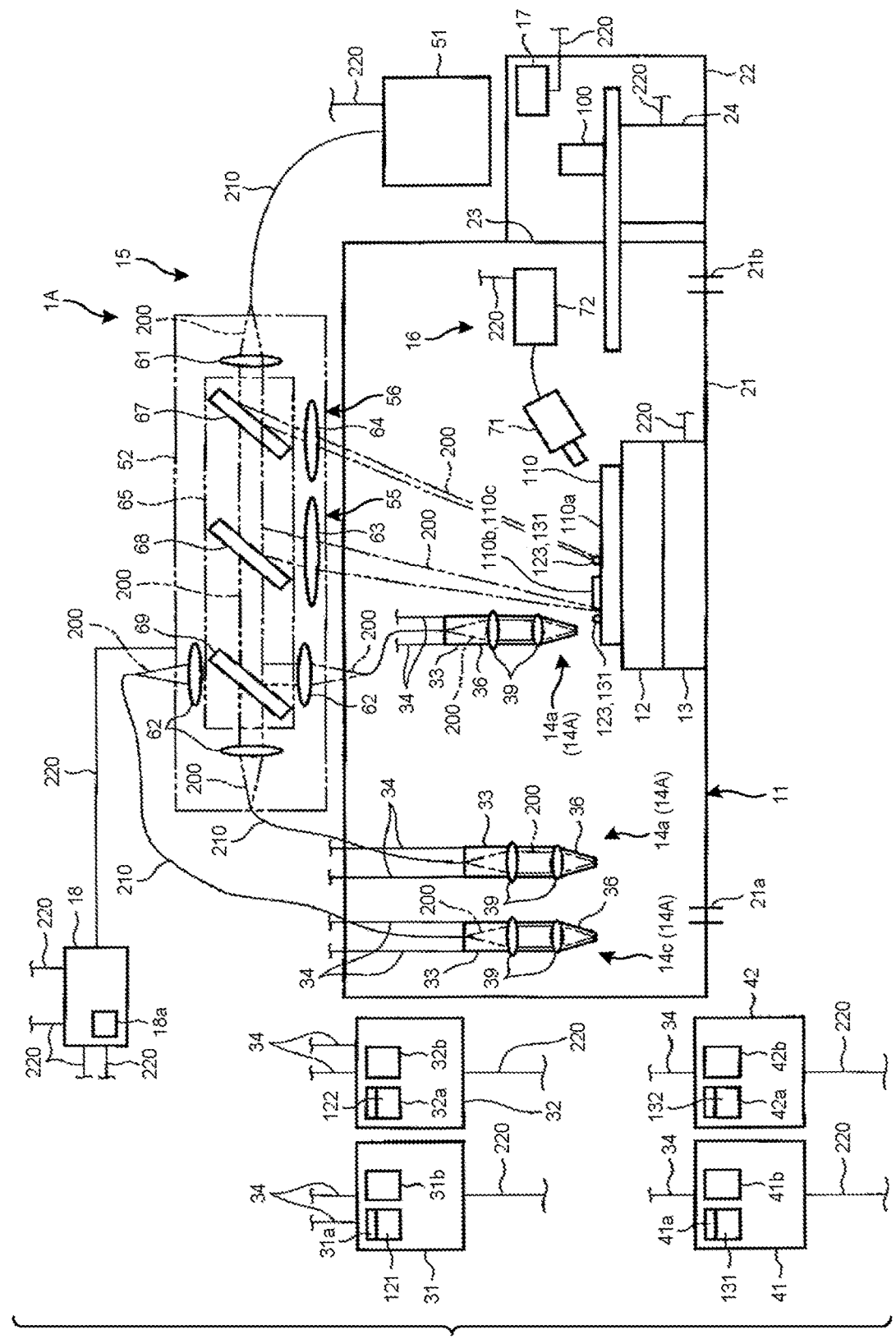
FIG. 8 is an explanatory diagram schematically showing the configuration of the stack forming apparatus according to the second embodiment.
Figure 11:
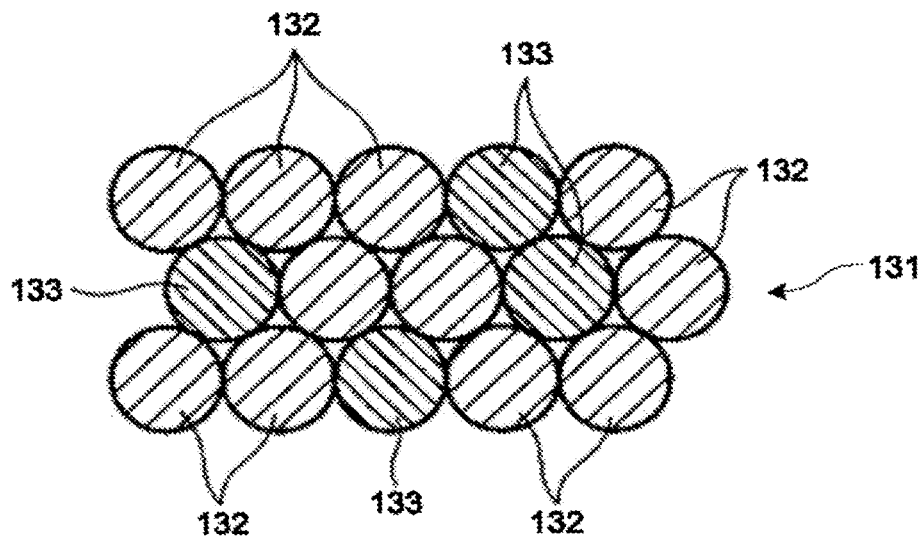
FIG. 11 is an explanatory diagram showing the configurations of the main material and the bind material used in the stack forming apparatus according to the third embodiment.

FIG. 8 is an explanatory diagram schematically showing the configuration of the stack forming apparatus 1A according to the second embodiment. FIG. 9 is an explanatory diagram showing an example of the manufacture of the support formation 101 using the stack forming apparatus 1A. FIG. 10 is an explanatory diagram showing the configuration of a support layer 110c as a part of the configuration of the support formation 101. FIG. 11 is an explanatory diagram showing the relation between a main material 132 and a bind material 133 of the support material 131 for forming the support layer 110c, and the laser light 200. Component of the stack forming apparatus 1A according to the second embodiment that are similar to the components of the stack forming apparatus 1 according to the first embodiment described above are provided with the same reference signs, and detailed descriptions thereof are omitted.

As shown in FIG. 8, the stack forming apparatus 1A comprises a treatment tank 11, a stage 12, a moving device 13, a nozzle device 14A, an optical device 15, a measurement device 16, and a controller 18. The stack forming apparatus 1A is configured to stack layers of forming materials 121 and 122 supplied by the nozzle device 14A on a target 110 provided on the stage 12 so that a stack formation 100 having a predetermined shape can be formed. In addition, the stack formation 100 is formed into a so-called overhang shape which partly protrudes to have a protrusion 100a.

The stack forming apparatus 1A is configured to stack layers of a support material 131 supplied by the nozzle device 14A on the target 110 so that a support formation 101 for supporting the protrusion 100a of the stack formation 100 can be formed.

The support material 131 comprises the main material 132 and the bind material 133. The main material 132 is a powdery metallic material. The bind material 133 is a powdery metallic material, and is a binder for bonding the main material 132. The main material 132 and the bind material 133 constitute the support material 131 (the support layer 110c).

The nozzle device 14A is configured to be able to selectively supply predetermined amounts of multiple kinds of materials to the target 110 on the stage 12, and to be able to emit the laser light 200. More specifically, the nozzle device 14A comprises a first nozzle device 14a which supplies a forming material to form the stack formation 100, and a second nozzle device 14c which supplies the support material 131 to support the stack formation 100.

The second nozzle device 14c comprises a third supply device 41 which can supply the main material 132, a fourth supply device 42 which can supply the bind material 133, a nozzle 43 connected to the third supply device 41, the fourth supply device 42, and the optical device 15, and supply pipes 34 which connect the third supply device 41 and the nozzle 43. That is, the second nozzle device 14c has a configuration in which the above-described second nozzle device 14b is provided with the fourth supply device 42 that can supply the bind material 133 to the nozzle 43.

The fourth supply device 42 comprises a tank 42a to store the bind material 133, and supply means 42b for supplying a predetermined amount of the bind material 133 to the nozzle 43 from the tank 42a. The supply means 42b is configured to be able to supply the bind material 133 in the tank 42a to the nozzle 43 by using inert gases of, for example, nitrogen and argon as carriers. The supply means 42b is also configured to be able to adjust the supply amount of the bind material 133 to be supplied, and the injection speed (supply speed) of the bind material 133 to be injected from the nozzle 43.

For example, the main material 132 is made of material having a melting point higher than those of the first forming material 121 and the second forming material 122 which are powdery metallic materials and which form the stack formation 100. The bind material 133 is, for example, the same metallic material as the main material 132 or a material having a melting point lower than that of the main material 132, and its particle diameter is formed to be sufficiently smaller than the particle diameter of the main material 132. The main material 132 and the bind material 133 are formed to have diameters smaller than the diameter of the laser light 200 to be applied, as shown in FIG. 9 and FIG. 10.

When, for example, AlSi12 (A4047, a melting point of 580° C.) is used as the forming material 123 to form the stack formation 100 by the first forming material 121 and the second forming material, it is possible to use Al (A1050, a melting point of 660° C.) having a particle diameter of 50 μm as the main material 132, and use AlSi12 (A4047, a melting point of 580° C.) having a particle diameter of 20 μm as the bind material 133. The volume mixing ratio of the bind material 133 to the main material 132 is 7.1% or less. A flux of, for example, Kf and CeF may be added to remove oxide films formed on the surfaces of the main material 132 and the bind material 133.

The particle diameters and volume mixing ratios of the main material 132 and the bind material 133 are found from the following expression.

For example, suppose that the materials 132 and 133 are arranged in the form of a face-centered cubic lattice when the materials 132 and 133 are closest-packed in the support layer 110c. The relation of radii R and r of the main material 132 and the bind material 133 is as shown in Expression (3), and the volume mixing ratio P to the main material 132 is as shown in Expression (4), from Expressions (1) and (2) below:

$$d^2+d^2=(4R)^2 \tag{1}$$

$$R+r=d/2 \tag{2}$$

$$r=R(\sqrt{2}-1) \tag{3}$$

$$P=(\sqrt{2}-1)^3 \tag{4}$$

wherein R is the radius of the main material 132, r is the radius of the bind material 133, and d is a lattice constant.

From Expression (3), when a material having a particle diameter of 50 μm is used as the main material 132, the particle diameter of the bind material 133 is 20 μm.

From Expression (4), the volume mixing ratio between the main material 132 and the bind material 133 is 7.1% or less. The particle diameters and volume mixing ratios of the main material 132 and the bind material 133 are not limited to the above, and can be suitably set as long as the support layer 110c can be formed.

In the same manner as the nozzle 33, for example, the nozzle 43 is configured to be able to mix therein the main material 132 and the bind material 133 in powder form supplied from the third supply device 41 and the fourth supply device 42, or to be able to respectively inject the main material 132 and the bind material 133 from the injection holes 37 and mix the main material 132 and the bind material 133 after the injection. The nozzle 43 is connected to gas supply means for supplying a shielding gas such as an inert gas, and is configured to be able to supply the shielding gas to an application portion of the laser light 200 from the light passage 38.

The controller 18 is electrically connected to the moving device 13, the removing device 17, the conveying device 24, the first supply device 31, the second supply device 32, the third supply device 41, the fourth supply device 42, the light source 51, the galvano-scanner 65, and the image processor 72 via the signal lines 220.

The controller 18 is configured to be able to move the stage 12 in three axial directions by controlling the moving device 13. The controller 18 is configured to be able to convey the formed stack formation 100 to the auxiliary chamber 22 by controlling the conveying device 24. The controller 18 is configured to be able to adjust the supply of the first forming material 121 and the supply amount and supply speed of the first forming material 121 by controlling the supply means 31b.

The controller 18 is configured to be able to adjust the supply of the second forming material 122 and the supply amount and supply speed of the second forming material 122 by controlling the supply means 32b. The controller 18 is configured to be able to adjust the supply of the main material 132 and the supply amount and supply speed of the main material 132 by controlling the supply means 41b. The controller 18 is configured to be able to adjust the supply of the bind material 133 and the supply amount and supply speed of the bind material 133 by controlling the supply means 42b.

The controller 18 is configured to be able to adjust the power density of the laser light 200 emitted from the light source 51 by controlling the light source 51. The controller 18 is configured to be able to adjust the inclination angles of the first galvano-mirror 67, the second galvano-mirror 68, and the branch mirror 69 by controlling the galvano-scanner 65. The controller 18 is also configured to be able to move the nozzle 33.

The controller 18 comprises a storage 18a. The shape of the stack formation 100 to be formed and the shape of the support formation 101 are stored in the storage 18a as thresholds. The ratio between the forming materials 121 and 122 in each layer 110b of the stack formation 100 to be formed is stored in the storage 18a. The ratio between the main material 132 and the bind material 133 in the support formation 101 to be formed is also stored in the storage 18a.

The controller 18 has the above-mentioned functions (1), (3), and (4), and also has the following function (5).

(5) A function of selectively injecting the main material 132 and the bind material 133 from the nozzle 43.

Now, the function (5) is described.

The function (5) is a function of selectively injecting the main material 132 and the bind material 133 from the nozzle 43 on the basis of the ratio between each support layer 110c of the support formation 101 as well as the main material 132 and the bind material 133 stored in the storage 18a.

More specifically, when the predetermined support layer 110c of the support formation 101 is formed, the nozzle 43 is moved relative to the target 110 to a range in which the support layer 110c of the support formation 101 formed in the same stratum as the layer 110b of the stack formation 100 formed by the function (1) is formed, and the supply means 41b and 42b of the third supply device 41 and the fourth supply device 42 are controlled. Thus, the main material 132 and the bind material 133 are injected to the target 110 from the nozzle 43 in the predetermined supply amount and at the predetermined supply speed.

Furthermore, the laser light 200 having power density to melt the bind material 133 is emitted from the nozzle 43, and then applied to the bind material 133 injected to the target 110. In addition, although the bind material 133 has the same melting point as the melting point of the main material 132, the bind material 133 melts before the main material 132 because the bind material 133 is formed to be diametrically smaller than the main material 132.

Thus, the bind material 133 is selectively melted, so that the bind material 133 alone melts while the main material 132 has not melted, and the support layer 110c in which the main material 132 is bonded by the bind material 133 is formed. In addition, the support layer 110c may be formed before the layer 110b in the same stratum of the stack formation 100 is formed by the function (1).

Thus, the function (5) is a function of forming each support layer 110c of the support formation 101 that has been preset on the target 110.

The stack forming apparatus 1A having the above-mentioned configuration repeatedly forms and stacks the layers 110b and support layers 110c having the predetermined shapes by the functions (1), (3) to (5) as in the previously described manufacturing method of the stack formation 100 using the stack forming apparatus 1, so that the stack formation 100 in which the protrusion 100a is supported by the support formation 101 formed.

The stack forming apparatus 1A having the above-mentioned configuration can support the stack formation 100 by the support formation 101 even if the stack formation 100 to be formed has the protrusion 100a, in the same manner as the previously described stack forming apparatus 1. In other words, according to the stack forming apparatus 1A, the layer 110b can be formed on the formed support layer 110c. Thus, even in the configuration in which the stack formation 100 is formed by the so-called directed energy deposition that ejects the forming materials 121 and 122 from the nozzle 33 and then melts the forming materials 121 and 122 by the laser light 200 to form the layer 110b, it is possible to form the stack formation 100 which has a shape with the protrusion 100a.

Since the support formation 101 is configured so that the main material 132 is bonded by use of the bind material 133 smaller in particle diameter than the main material 132, the support formation 101 can be mechanically removed by, for example, the shot blast, and the support formation 101 can be easily removed.

The main material 132 is a material having a melting point higher than those of the first forming material 121 and the second forming material 122 to form the stack formation 100, so that it is possible to prevent the main material 132 from melting in the first forming material 121 and the second forming material 122 when the layer 110b is formed on the support layer 110c by the first forming material 121 and the second forming material 122.

As described above, according to the manufacturing method of the stack formation 100 using the stack forming apparatus 1A in the present embodiment, it is possible to form the stack formation 100 which has the partly protruding protrusion 100a. Since the support formation 101 is configured so that the main material 132 is bonded by the bind material 133, it is possible to easily remove the support formation 101 for forming the protrusion 100a.

Third Embodiment

Now, a manufacturing method of the stack formation 100 using the stack forming apparatus 1A according to the third embodiment is described below with reference to FIG. 11. The stack forming apparatus 1A according to the third embodiment has the same configuration as that of the previously described stack forming apparatus 1A according to the second embodiment, and only the bind material 133 of the support material 131 for forming the support formation 101 is different.

More specifically, as shown in FIG. 11, the bind material 133 is made of a material lower in melting point than the main material 132. The bind material 133 may have substantially the same particle diameter as the particle diameter of the main material 132 or may have a particle diameter smaller than the particle diameter of the main material 132. In the example described with reference to FIG. 11, the particle diameter of the bind material 133 is formed to be substantially the same particle diameter as the particle diameter of the main material 132. That is, the support layer 110c is made of the support material 131 (the main material 132 and the bind material 133) having different melting points.

For example, pure aluminum (melting point: 660° C.) is used for the main material 132, and an AlSi alloy (Si: 12%, melting point: 660° C.) is used for the bind material 133.

According to the manufacturing method of the stack formation 100 using the support material 131 comprising the main material 132 and the bind material 133, the bind material 133 melts before the main material 132 when the support layer 110c is formed, so that the main material 132 is bonded by the bind material 133. Thus, in the same manner as the support formation 101 according to the previously described second embodiment, the support formation 101 formed to support the protrusion 100a of the stack formation 100 can be easily removed by the removing device 17.

As described above, according to the manufacturing method of the stack formation 100 using the stack forming apparatus 1A in the present embodiment, it is possible to form the stack formation 100 having the protrusion 100a and easily remove the support formation 101, as in the first embodiment and the second embodiment that have been previously described.

Fourth Embodiment

Now, a manufacturing method of the stack formation 100 using the stack forming apparatus 1 according to the fourth embodiment is described below. The stack forming apparatus 1 according to the fourth embodiment has the same configuration as that of the previously described stack forming apparatus 1 according to the first embodiment, and only the support material 131 for forming the support formation 101 is different.

Figure 12:
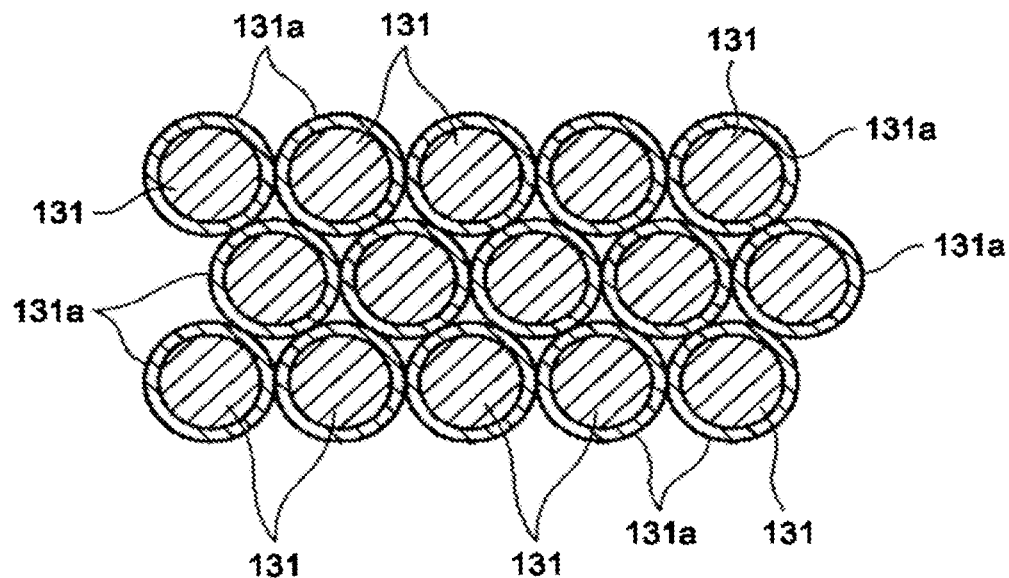
FIG. 12 is an explanatory diagram showing the configuration of a main material used in the stack forming apparatus according to the fourth embodiment.

More specifically, as shown in FIG. 12, the support material 131 is made of a powdery metallic material higher in melting point than the first forming material 121 and the second forming material 122 to form the stack formation 100, and a bind layer 131a which is a binder is formed on the surface of the support material 131. The bind layer 131a is made of a material lower in melting point than the support material 131.

For example, when the support material 131 is made of copper (melting point: 1085° C.), the bind layer 131a is made of a CuP alloy (melting point: 800° C.).

According to the manufacturing method of the stack formation 100 using the support material 131, the bind layer 131a melts before the support material 131 when the support layer 110c is formed, so that the support material 131 is bonded by the bind layer 131a. Thus, in the same manner as the support formation 101 according to the second embodiment and the third embodiment, the support formation 101 formed to support the protrusion 100a of the stack formation 100 can be easily removed by the removing device 17.

As described above, according to the manufacturing method of the stack formation 100 using the stack forming apparatus 1 in the present embodiment, it is possible to form the stack formation 100 having the protrusion 100a and easily remove the support formation 101, as in the previously described first to third embodiments.

Fifth Embodiment

Figure 13:
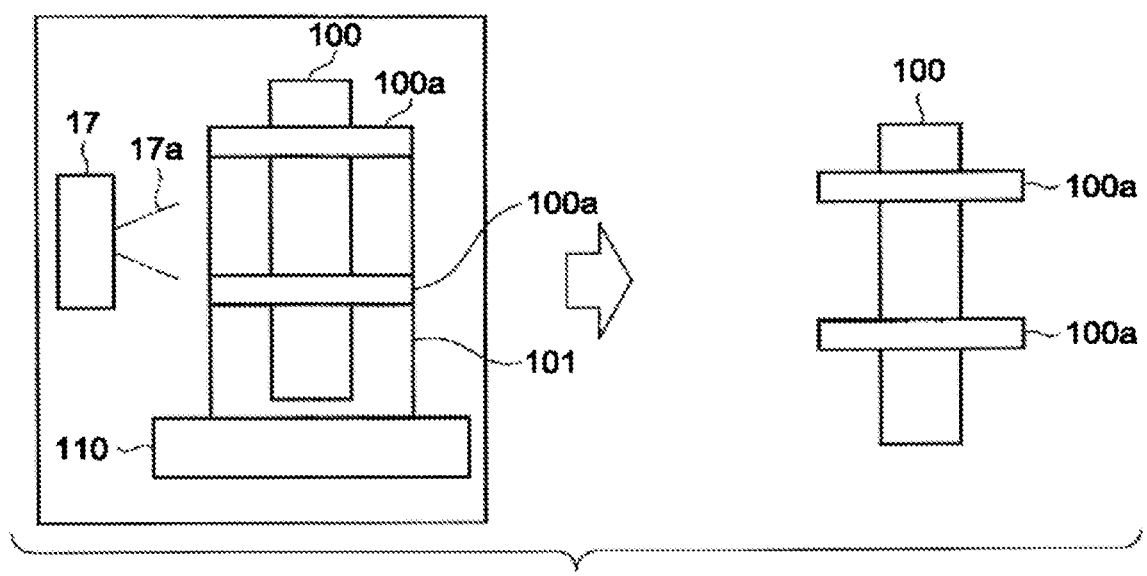
FIG. 13 is an explanatory diagram showing an example of the manufacture of a support formation that uses the stack forming apparatuses according to a fifth embodiment and a sixth embodiment.

Now, a manufacturing method of the stack formation 100 using the stack forming apparatus 1 according to the fifth embodiment is described below with reference to FIG. 13. The stack forming apparatus 1 according to the fifth embodiment has the same configuration as that of the previously described stack forming apparatus 1 according to the first embodiment, but the removing device 17 and the support material 131 for forming the support formation 101 are different.

The removing device 17 is configured to be able to remove the support formation 101 by an etching treatment using an etching solution 17a. The etching solution 17a used in the removing device 17 can dissolve the support material 131, and the forming materials 121 and 122 to form the stack formation 100 have non-dissolution properties.

The support material 131 is made of a powdery metallic material having dissolution properties to be dissolved by the etching solution 17a used in the removing device 17. It is preferable that the support material 131 is formed to have a melting point higher than those of the forming materials 121 and 122.

For example, when aluminum is used for the forming materials 121 and 122, a material based on iron is used for the support material 131, and the etching solution 17a which dissolves the support material 131 is used in the removing device 17. For example, when aluminum is used for the forming materials 121 and 122, a material based on copper is used for the support material 131, and the etching solution 17a which dissolves the support material 131 is used in the removing device 17.

According to the manufacturing method of the stack formation 100 using the removing device 17 and the support material 131 above, the formed support formation 101 is dissolved and removed by the etching treatment using the removing device 17, so that the support formation 101 can be easily removed.

As described above, according to the manufacturing method of the stack formation 100 using the stack forming apparatus 1 in the present embodiment, it is possible to form the stack formation 100 having the protrusion 100a and easily remove the support formation 101, as in the previously described first to fourth embodiments.

Sixth Embodiment

Now, a manufacturing method of the stack formation 100 using the stack forming apparatus 1A according to the sixth embodiment is described below with reference to FIG. 13. The stack forming apparatus 1 according to the sixth embodiment has the same configuration as that of the previously described stack forming apparatus 1A according to the second embodiment, but the main material 132 and the bind material 133 of the support material 131 for forming the support formation 101 are different.

The removing device 17 is configured to be able to dissolve the bind material 133 by an etching treatment using the etching solution 17a. The etching solution 17a used in the removing device 17 can dissolve the bind material 133, and the forming materials 121 and 122 to form the stack formation 100 and the main material 132 that have non-dissolution properties are used.

The main material 132 is made of a powdery material having a melting point higher than those of the forming materials 121 and 122 and having non-dissolution properties to the etching solution 17a. For example, the main material 132 is made of ceramics.

The bind material 133 is made of a powdery metallic material having a melting point lower than that of the main material 132. For example, the bind material 133 is formed to have a particle diameter smaller than the particle diameter of the main material 132. The bind material 133 has dissolution properties to be dissolved in the etching solution 17a.

For example, when an SUS material (melting point: 1500° C.) is used for the forming materials 121 and 122, alumina ($Al_2O_3$, melting point: 2100° C.) having a particle diameter of 50 μm is used for the main material 132, and $Al_{12}Si$ (melting point: 600° C.) having a particle diameter of 20 μm is used for the bind material 133. Moreover, the etching solution 17a which dissolves the bind material 133 is used for the removing device 17.

According to the manufacturing method of the stack formation 100 using the removing device 17 and the support material 131 which is constituted by the main material 132 and the bind material 133, the bind material 133 which bonds the main material 132 is removed by the etching treatment using the etching solution 17a, so that the support formation 101 can be removed. As a result, the support formation 101 can be easily removed.

The etching solution 17a used in the removing device 17 does not dissolve the main material 132. Thus, it is possible to use the main material 132 collected in the support material 131 used in the next formation of the support formation 101 by collecting the main material 132 after the removal of the support formation 101. Consequently, manufacturing costs for the stack formation 100 can be reduced. The stack forming apparatus 1 may be configured to have a collector for the main material 132.

As described above, according to the manufacturing method of the stack formation 100 using the stack forming apparatus 1 in the present embodiment, it is possible to form the stack formation 100 having the protrusion 100a and easily remove the support formation 101, as in the previously described first to fifth embodiments. Moreover, according to the manufacturing method of the stack formation 100, the main material 132 which constitutes the support material 131 can be reused.

The manufacturing methods of the stack forming apparatus 1, 1A and the stack formation 100 according to the present embodiment are not limited to the configuration described above. For example, although the stack forming apparatus 1, 1A is configured to form the stack formation 100 by the first forming material 121 and the second forming material 122 in the example described above, the stack formation 100 may be formed by a single material. Although the stack forming apparatus 1, 1A is configured to supply the first forming material 121 and the second forming material 122 to one nozzle 33 in the example described above, the stack forming apparatus 1, 1A is not limited to this. The stack forming apparatus 1, 1A may be configured to respectively supply the first forming material 121 and the second forming material 122 to two nozzles 33, and mix and dissolve the first forming material 121 and the second forming material 122 on the target 110.

Although the stack forming apparatus 1A is configured to have the third supply device 41 and the fourth supply device 42 to supply the main material 132 and the bind material 133 in the example described above, the stack forming apparatus 1A is not limited to this. For example, the stack forming apparatus 1A may have the third supply device 41 alone, the main material 132 and the bind material 133 may be stored in the same tank 41a, and the main material 132 and the bind material 133 may be supplied to the nozzle 43 by the supply means 41b. Moreover, the main material 132 and the bind material 133 may be supplied by use of the nozzle 33 for supplying the forming materials 121 and 122.

Although the removing device 17 is configured to mechanically remove the support formation 101 from the stack formation 100 by, for example, the shot blast or cutting in the example described above, or configured to chemically remove the support formation 101 from the stack formation 100 by the etching treatment using the etching solution, the removing device 17 is not limited to this. For example, the removing device 17 may be configured so that the bind material 133 is lower in temperature than the forming materials 121 and 122 and the main material 132, and the support formation 101 is heated to a temperature at which the bind material 133 alone is melted, whereby the support formation 101 is thermally removed from the stack formation 100.

Although the stack forming apparatus 1, 1A comprises the main chamber 21 and the auxiliary chamber 22 and has the removing device 17 in the auxiliary chamber 22 in the example described above, the stack forming apparatus 1, 1A is not limited to this. The removing device 17 may be configured to be located apart from the auxiliary chamber 22.

Furthermore, although the laser light 200 is applied to melt the target 110 and the forming materials 121 and 122 as well as part of the support material 131, the bind material 133, or the bind layer 131a in the example described above, this is not a limitation. The target 110 and the forming materials 121 and 122 as well as part of the support material 131, the bind material 133, or the bind layer 131a may be melted by some other energy beam such as an electron beam or radiation instead of the laser light 200 if necessary.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The invention claimed is:

1. A manufacturing method of a stack formation, the method comprising:
supplying a powdery forming material which forms a formation from a nozzle to a target;
irradiating the forming material supplied by the nozzle with an energy beam to form layers, the energy beam being output from an optical system and being configured to melt the forming material;
supplying a support material that comprises a powdery main material and a metallic bind material to the target from the nozzle, the support material forming a support layer which permits the layers formed by the forming material to be formed on the top surface thereof, the main material having a melting point higher than that of the forming material and having a non-dissolution property to an etching solution, the bind material being dissolvable in the etching solution; and
irradiating the support material injected onto the target by the nozzle with the energy beam to form the support layer, the energy beam being output from the optical system and being configured to partly melt the support material, wherein
in the supplying the support material, the main material and the bind material are mixed together in the nozzle.

2. The manufacturing method of the stack formation according to claim 1, wherein the bind material is powdery and is formed to have a particle diameter smaller than that of the main material.

3. The manufacturing method of the stack formation according to claim 1, wherein the bind material is powdery and is made of a material lower in melting point than the main material.

4. The manufacturing method of the stack formation according to claim 1, further comprising removing, by a removing device, the support layer formed by the support material.

5. The manufacturing method of the stack formation according to claim 1, further comprising:
measuring, by a measurement device, shapes of the stack formation and a support formation;
comparing the measurement device with thresholds, the thresholds being stored in a storage and being the layers and the support layer which are formed by the forming material and the support material and which have predetermined shapes; and removing, by a trimming device, the forming material and the support material on the target which have deviated from the thresholds on the target.

* * * * *